United States Patent Office 3,155,993
Patented Nov. 10, 1964

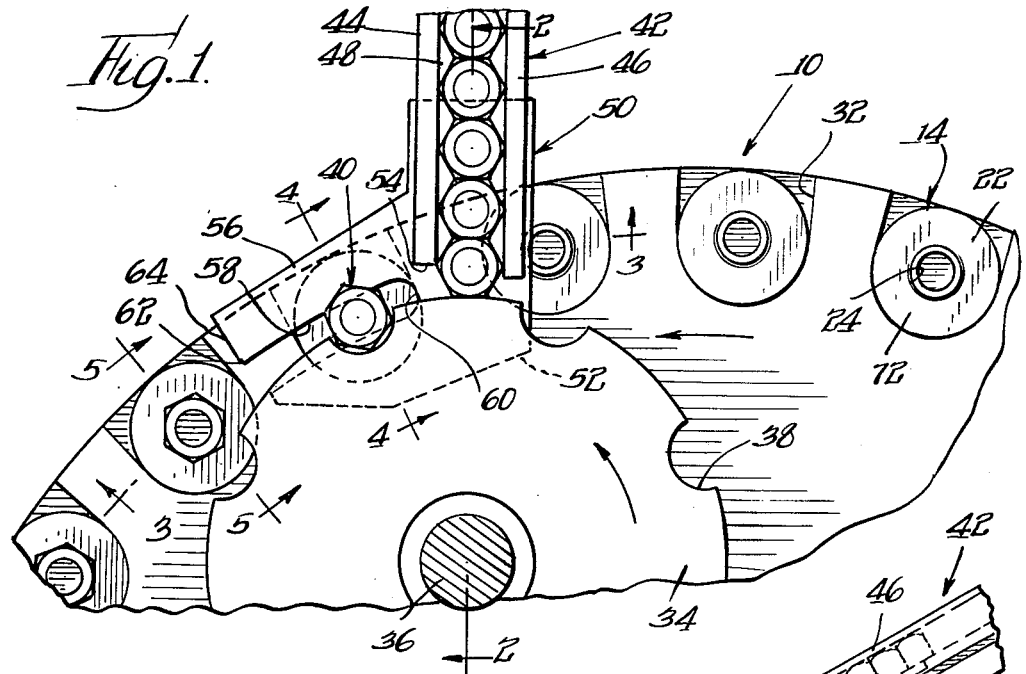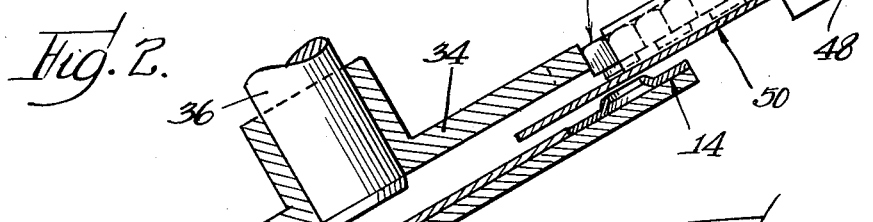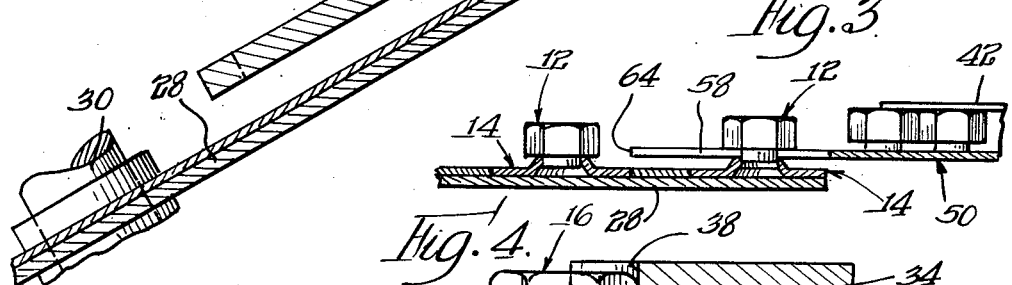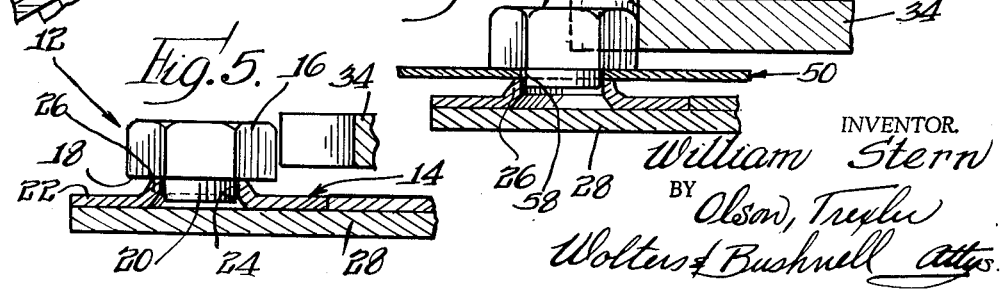

3,155,993
MECHANISM FOR ASSEMBLING NUT MEMBERS AND WASHERS
William Stern, Park Ridge, Ill., assignor to Illinois Tool Works Inc., Chicago, Ill., a corporation of Delaware
Filed Aug. 27, 1962, Ser. No. 219,638
3 Claims. (Cl. 10—155)

The present invention relates to a novel apparatus for feeding and assembling workpieces, and more specifically to a novel apparatus for assembling washers having an aperture therethrough and nut members.

While certain features of the present invention may be utilized for processing various workpieces, it is contemplated that the mechanism will be especially suitable for assembling nut members of the type having a short neck portion depending from a clamping face thereof with apertured washers. As will be understood, after the nut members and washers are assembled, either the neck portions of the nut members may be expanded or the inner marginal portions of the washers may be collapsed for securing the parts in assembled relationship with each other.

Heretofore proposed mechanisms have included rotary discs or turrets respectively for feeding washers and nut members to a position at which the nut members are dropped by gravity into assembled relationship with the washers. While such mechanisms have been generally satisfactory, it has been found that when certain workpieces are being processed, particularly washers having a very large diameter or elongated or top-heavy nut members, difficulties are encountered in obtaining proper assembly of the nut members with the washers as a result of a tendency of the nut members to tilt or to remain in engagement with their feeding or turret means.

It is an important object of the present invention to provide a novel mechanism for feeding and assembling workpieces such as washers and nut members in a manner so as substantially to eliminate any possibility of improper assembly as the result of tilting of the nut member or failure of the nut member to disengage from its feeding device.

A more specific object of the present invention is to provide a novel mechanism of the above described type which is of simple, economical and efficient construction.

Other objects and advantages of the present invention will become apparent from the following description wherein:

FIG. 1 is a fragmentary plan view of a mechanism incorporating features of the present invention;

FIG. 2 is a fragmentary sectional view taken along line 2—2 in FIG. 1;

FIG. 3 is a fragmentary partial sectional view taken along line 3—3 in FIG. 1;

FIG. 4 is a fragmentary partial sectional view taken along line 4—4 in FIG. 1; and FIG. 5 is a fragmentary partial sectional view taken along line 5—5 in FIG. 1.

Referring now more specifically to the drawings wherein like parts are designated by the same numerals throughout the various figures, a feeding and assembling mechanism 10 incorporating features of the present invention is especially suitable for assembling nut members 12 with washers 14. In the embodiment shown, each of the nut members comprises a relatively heavy body portion 16 having a radially extending clamping face 18 and a short neck portion 20 depending from the clamping face. Each of the washers comprises a main body 22 and a central opening 24 through which a nut member neck portion 20 is adapted to extend. An inner marginal portion 26 of the washer projects upwardly for surrounding a nut member neck portion. As will be understood, after the parts have been assembled, either the nut member neck portions or the washer inner marginal portions may be deflected for interlocking engagement whereby the parts are permanently connected in assembled relationship.

The mechanism 10 comprises means for feeding successive washers 14 along a predetermined arcuate path of travel. In the embodiment shown, this means comprises a rotary disc or turret 28 fixed on a driven shaft 30 which is mounted for rotation about an axis inclined with respect to the vertical and the horizontal as shown in FIG. 2. Pockets 32 are spaced around a peripheral portion of the turret or disc means 28 for receiving and retaining successive washers 14. As will be understood suitable means, not shown, will be provided for depositing the washers in the pockets 32 and for subsequently removing the washers having nut members assembled therewith from the pockets.

In order to feed successive nut members along the path of travel of the washers and into alignment with successive washers, the mechanism is provided with a second rotatable disc member or turret 34 disposed above and parallel to the turret or disc means 28. The turret 34 is fixed on a driven shaft 36 which is parallel to the shaft 30. As will be understood, any suitable combination of gears, belts, drive chains and the like may be provided for driving the turrets 28 and 34 in predetermined timed relationship for obtaining proper registration of successive nut members with successive washers. In this connection it is to be noted that the turret 34 is provided with a plurality of circumferentially spaced generally semicircular pockets 38 which are adapted to receive successive nut members and which are adapted to become aligned with successive pockets 32 of the turret 28 at a work station 40. The turret 34 is considerably smaller in diameter than the turret 28 and is located entirely within the periphery of the turret 28. Thus the path of travel of the pockets 38 gradually approaches and recedes from the path of travel of the washers for facilitating proper alignment of and interengagement between successive washers and nut members.

Nut members are supplied to the turret 34 from an inclined guideway or chute 42 having opposite guide rails 44 and 46 and a bottom member 48. Adjacent the lower end of the chute, the bottom member 48 merges with a coplanar plate member 50 which serves slidably to support the nut members by engaging the lower ends of their respective neck portions.

The plate member 50 has a portion 52 which projects beneath the turret 34 and over but in close proximity to the turret 28 for supporting nut members which enter the pockets 38 in the turret 34. In this connection it will be observed that the guide rail 44 has a terminal end 54 spaced from the periphery of the turret 34 so that nut members which enter the pockets 38 of the turret 34 are free to move with the turret 34 along and over the path of travel of the washers.

It is important to note that the plate member 50 comprises another portion 56 which extends laterally of the guide or chute 42 in the direction of movement of the washers. The plate portion 56 is formed with an elongated slot 58 having a width similar to and slightly greater than the diameter of the neck portion 20 of the nut members. The slot 58 is curved throughout its length and a first end 60 of the slot is offset laterally from the longitudinal axis of the guideway or chute 42 and is disposed so that its axis intersects a circle including the centers of the pockets 38 of the turret 34. With this construction, a nut member, upon entering a pocket 38, will move with the turret 34 laterally of the guideway or chute 42 for a short distance while the lower end of its neck portion 20 is still supported by the plate portion 52. When the nut member is advanced sufficiently so that its neck portion 20 completely traverses the end 60 of the slot, the neck portion will enter the slot and the entire nut member will drop downwardly.

The portion of the slot between the end 60 and the station 40 flares outwardly from the turret 34 to a position concentric with the path of travel of the washers in the pockets 32 at which point the neck portion of the nut member is free to drop partially into the apertured washer as shown in FIGS. 3 and 4. At the same time the edges of the plate portion 56 at opposite sides of the slot 58 engages the underside or clamping surface of the nut body and slidably support the nut as it continues to move along its path of travel.

It is to be noted that when the nut member drops downwardly from the righthand position to the intermediate position shown in FIG. 3 or, in other words, so that its neck portion enters the slot, the distance which the nut member falls is relatively small. This minimizes any tendency for the nut member to tilt in a manner which would prevent proper alignment with the washer. It is further to be noted that the nut member is engaged by edges of the pocket 38 along one side and its front and back at the time when the neck portion drops into the slot whereby positive control of the nut member is maintained and any possibility of tilting is substantially eliminated.

The slot 58 has an outer open end 62 at a terminal end 64 of the plate portion 56. The portion of the slot between the station 40 and the outer open end 62 has a curvature corresponding to the arcuate path of travel of the washers on the turret 28. The curve of this portion of the slot is concentric with the turret 28. Thus the slot flares gradually away from the periphery of the turret 34 as shown best in FIG. 1 so that the radially inner edge of the slot serves to deflect the nut member outwardly with respect to the turret 34 for disengaging the nut member from a pocket 38 of the turret.

As a nut member moves along the slot 58 and is progressively disengaged from a pocket 38 in the turret 34, it is engaged by and driven by an associated washer 14 on the turret 28. When the nut member advances with its associated washer beyond the end 64 of the plate portion 56, it drops from the plate member to a fully assembled position directly on top of the washer as shown best in FIGS. 3 and 5. The distance which the nut member drops at this point is relatively short whereby any tendency for the nut member to tilt is minimized. Furthermore, the partial telescopic association of the nut member neck portion with the washer when the nut member passes beyond the end 64 of the plate positively assures proper assembly between the washer and the nut member.

While a preferred embodiment of the present invention has been shown and described herein, it is obvious that many structural details may be changed without departing from the spirit and scope of the appended claims.

The invention is claimed as follows:

1. A mechanism for assembling workpieces such as nut members having a body and a neck portion depending from a clamping surface thereof and apertured washers, comprising a first rotary turret mounted for rotation about a predetermined axis for feeding a plurality of washers successively along a predetermined arcuate path of travel, a second rotatable turret disposed closely above said first turret and mounted for rotation about an axis substantially parallel to said first mentioned axis for feeding successive nut members above said path of travel and into axial alignment with successive washers, said axis of said second turret being located radially inwardly of said arcuate path of travel, said second turret having a diameter substantially less than the diameter of said first turret, said second turret having circumferentially disposed nut member receiving and retaining means movable along a path of travel from a nut member receiving position located radially inwardly of said first mentioned path of travel, to a second position substantially in alignment with said first mentioned path of travel and then radially inwardly of said first mentioned path of travel, means for supplying nut members to said second mentioned turret at said first position, means extending between said first and second mentioned turrets at said first position for supporting nut members above said first mentioned path of travel at said first position and for lowering the nut members into partially assembled relationship with the washers during movement of the nut members from said first position toward said second position, and means substantially concentric with said first turret and extending along said path of travel from adjacent said second position for engaging neck portions of successive nut members for guiding the nut members along said first mentioned path of travel and disengaging the nut members from said second mentioned turret.

2. A mechanism, as defined in claim 1, wherein said last mentioned means includes a plate member having an arcuate slot therein for receiving and engaging neck portions of the nut members, said plate member being engageable with the clamping surfaces of the nut members for supporting the nut members in partially assembled relationship with the washers, and said plate member having a terminal end at a predetermined location for disengaging from the nut members advancing along said first mentioned path of travel and enabling the nut members to drop into fully assembled relationship with the washers.

3. A mechanism, as defined in claim 1, wherein said means for supplying nut members comprises a chute extending over a peripheral portion of said first turret and terminating substantially at said first position adjacent said second turret.

References Cited by the Examiner

UNITED STATES PATENTS

| | | | |
|---|---|---|---|
| 2,792,578 | 5/57 | Autio | 10—155 |
| 2,914,781 | 12/59 | Prutton | 10—155 |
| 2,927,333 | 3/60 | Stern | 10—155 |
| 3,114,159 | 12/63 | Yoshikawa | 10—155 |

ANDREW R. JUHASZ, *Primary Examiner.*